Sept. 15, 1953    B. H. CARROLL    2,652,330
SUPERSENSITIZATION OF PHOTOGRAPHIC EMULSIONS
WITH COMPLEX MEROCYANINE DYES
Filed May 23, 1952

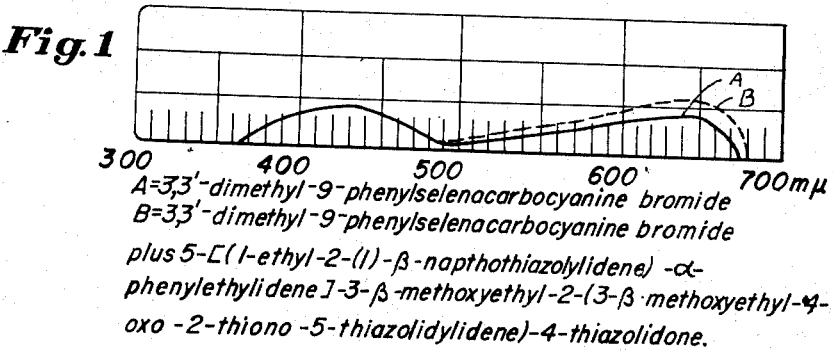

Fig.1

A = 3,3'-dimethyl-9-phenylselenacarbocyanine bromide
B = 3,3'-dimethyl-9-phenylselenacarbocyanine bromide
plus 5-[(1-ethyl-2-(1)-β-napthothiazolylidene)-α-
phenylethylidene]-3-β-methoxyethyl-2-(3-β-methoxyethyl-4-
oxo-2-thiono-5-thiazolidylidene)-4-thiazolidone.

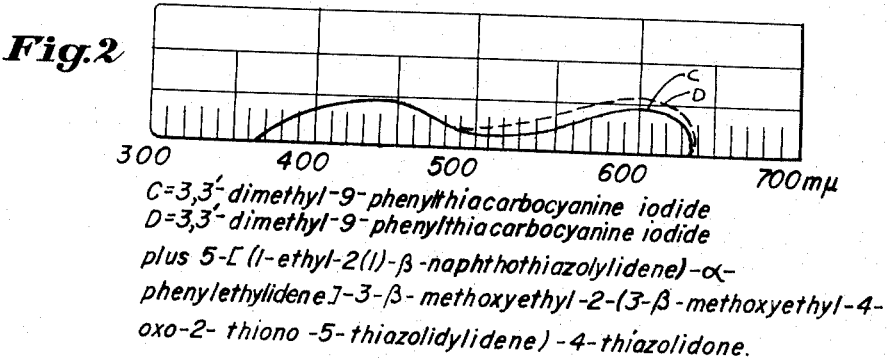

Fig.2

C = 3,3'-dimethyl-9-phenylthiacarbocyanine iodide
D = 3,3'-dimethyl-9-phenylthiacarbocyanine iodide
plus 5-[(1-ethyl-2(1)-β-naphthothiazolylidene)-α-
phenylethylidene]-3-β-methoxyethyl-2-(3-β-methoxyethyl-4-
oxo-2-thiono-5-thiazolidylidene)-4-thiazolidone.

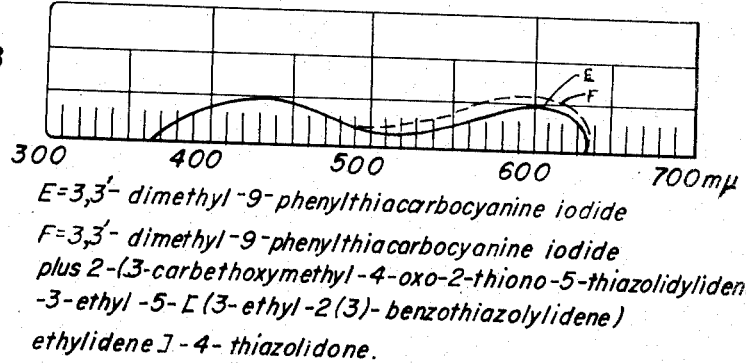

Fig.3

E = 3,3'-dimethyl-9-phenylthiacarbocyanine iodide
F = 3,3'-dimethyl-9-phenylthiacarbocyanine iodide
plus 2-(3-carbethoxymethyl-4-oxo-2-thiono-5-thiazolidylidene)
-3-ethyl-5-[(3-ethyl-2(3)-benzothiazolylidene)
ethylidene]-4-thiazolidone.

Burt H. Carroll
INVENTOR.
BY
ATTY. & AGT.

Patented Sept. 15, 1953

2,652,330

UNITED STATES PATENT OFFICE 2,652,330

SUPERSENSITIZATION OF PHOTOGRAPHIC EMULSIONS WITH COMPLEX MEROCYANINE DYES

Burt H. Carroll, Rochester, N. Y., assignor to Eastman Kodak Company, Rochester, N. Y., a corporation of New Jersey Application May 23, 1952, Serial No. 289,623

19 Claims. (Cl. 95—7)

This invention relates to photographic emulsions comprising certain meso-substituted carbocyanine dyes, and as supersensitizers, therefor, certain complex merocyanine dyes.

It is known in the art of making photographic emulsions that certain dyes of the cyanine class alter the sensitivity of photographic emulsions of the gelatino-silver kind, when the dyes are incorporated in the emulsions. It is also known that the sensitization produced by a given dye varies somewhat with the type of emulsion in which the dye is incorporated. Furthermore, the sensitization of a given emulsion by a given dye may be altered by varying conditions in the emulsion. For example, the sensitization may be increased by increasing the silver ion concentration or decreasing the hydrogen ion concentration (i. e. increasing the alkalinity) or both. Thus, sensitization can be increased by bathing plates, coated with a spectrally sensitized emulsion, in water or in aqueous solutions of ammonia. Such a process of altering the sensitivity of a sensitized emulsion by increasing the silver ion concentration and/or by decreasing the hydrogen ion concentration is commonly called "hypersensitization." Hypersensitized emulsions have generally poor keeping qualities.

I have now found a new means of altering the sensitivity in emulsions containing certain meso-substituted carbocyanine dyes of a particular type. Since the conditions in the emulsion, i. e. the hydrogen ion and/or the silver ion concentration undergo little or no change in my new method, I shall designate my new method as a kind of supersensitization.

It is, therefore, an object of my invention to provide photographic emulsions comprising certain meso-substituted carbocyanine dyes and, as supersensitizers therefor, certain complex merocyanine dyes. Another object is to provide a process for preparing these supersensitized emulsions. Other objects will become apparent from a consideration of the following description and examples.

The complex merocyanine dyes useful in practicing my invention have been previously proposed as sensitizers for photographic emulsions in Brooker U. S. Patent 2,454,629, issued November 23, 1948, beginning at line 62, col. 17. The parent merocyanine dyes from which the complex dyes are derived have no corresponding supersensitizing effects. Nor do the complex cyanines (also described in 2,454,629) derived from the same parent merocyanine dyes exhibit the supersensitizing effects shown in the instant invention. The unique character of, and unexpected behavior exhibited by my new supersensitizing combinations are thus evident.

The meso-substituted carbocyanine dyes useful in practicing my invention can advantageously be represented by the following general formula:

I.
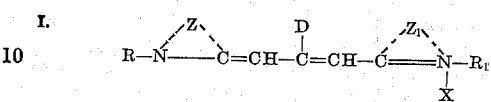

wherein R and $R_2$ each represents an alkyl group, e. g. methyl, ethyl, $\beta$-hydroxyethyl, etc., D represents an alkyl group, e. g. methyl, ethyl, etc., or an aryl group, e. g. phenyl, tolyl, etc. (i. e. a mononuclear aromatic group of the benzene series), Z and $Z_1$ each represents the non-metallic atoms necessary to complete a heterocyclic nucleus selected from the group consisting of those of the benzothiazole series, those of the benzoselenazole series, and those of the $\beta$-naphthothiazole series, and X represents an acid anion, e. g. chloride, bromide, iodide, p-toluenesulfonate, benzenesulfonate, etc. The dyes represented by Formula I can be prepared according to the methods of U. S. Patents 1,934,659; 1,969,444; 1,969,447; and 2,058,406, for example.

The complex merocyanines useful in practicing my invention can be represented by the following general formula:

II.
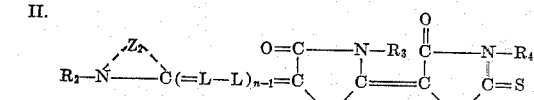

wherein $R_2$, $R_3$, and $R_4$ each represents an alkyl group, such as methyl, ethyl, n-propyl, n-butyl, n-heptyl, $\beta$-hydroxyethyl, carbethoxymethyl, $\beta$-methoxyethyl, $\beta$-ethoxyethyl, $\beta$-hydroxy-$\beta$-ethoxy-$\beta$-ethoxyethyl, etc., L represents a methine group (i. e. —$CR_5$=, wherein $R_5$ is a hydrogen atom, an alkyl group (methyl, ethyl, etc.) or an aryl group (phenyl, tolyl, etc.), etc.), $n$ represents a positive integer of from 1 to 2, and $Z_2$ represents the non-metallic atoms necessary to complete a heterocyclic nucleus selected from those of the benzothiazole series and the $\beta$-naphthothiazole series. The complex merocyanine dyes represented by Formula II above can be prepared according to the method described in U. S. Patent 2,454,629, mentioned above.

According to my invention, I incorporate one or more of the meso-substituted carbocyanine dyes selected from those represented by Formula I above with one or more of the complex merocyanine dyes selected from those represented by Formula II above in a photographic emulsion. My invention is particularly directed to the ordinarily employed gelatino-silver-halide emulsions. However, my supersensitizing combination can be employed in silver halide emulsions in which the carrier is other than gelatin, e. g., a resinous substance or cellulosic material which has no deteriorating effect on the light-sensitive materials.

The sensitizing dyes can be employed in various concentrations depending upon the effects desired. As is well known in the art, the sensitivity conferred upon an emulsion by a sensitizing dye does not increase proportionately to the concentration of the dye in the emulsion, but rather passes through a maximum as the concentration is increased. In practicing my invention, the individual sensitizing dyes are advantageously employed in a concentration somewhat less than their optimum concentration (i. e. the concentration at which the individual dyes give greatest sensitivity). If each of the dyes in the supersensitizing combination is employed in its optimum concentration, it is possible, in certain cases that the sensitization produced by the supersensitizing combination will have passed through a maximum.

The optimum concentration of an individual sensitizing dye can be determined in a manner well known to those skilled in the art by measuring the sensitivity of a series of test portions of the same emulsion, each portion containing a different concentration of the sensitizing dye. The optimum concentration of my supersensitizing combinations can, of course, be readily determined in the same manner, by measuring the sensitivity of a series of test portions of the same emulsion, each portion containing different concentrations of the individual dyes in the combination. In determining the optimum concentration for the supersensitizing combination, it is advantageous to employ, at first, concentrations of the individual dyes less than their optimum concentrations. The concentrations of the individual dyes can then be increased until the optimum concentration of the supersensitizing combination is determined.

Ordinarily the optimum or near optimum concentration of the meso-substituted carbocyanine dyes, selected from those represented by Formula I above which I employ in practicing my invention, is of the order of from 0.02 to 0.20 g. per mole of silver halide in the emulsion.

The complex merocyanine dyes selected from those represented by Formula II above are advantageously employed at concentrations on the order of 0.001 to 0.05 g. per mole of silver halide in the emulsion.

Generally speaking, the ratio of concentration of the complex merocyanine dye (Formula II) to meso-substituted carbocyanine dye (Formula I) can vary rather widely in my new combinations, e. g. from 1:100 to 1:2 (by weight) in many cases.

The methods of incorporating sensitizing dyes in emulsions are well known to those skilled in the art. In practicing my invention, the sensitizing dyes can be incorporated in the emulsions separately or together. It is convenient to add the dyes separately in the form of solutions in appropriate solvents. Methanol and ethanol, especially the former, have proven satisfactory as solvents for the dyes of Formula I which I employ, while acetone has proven satisfactory as a solvent (with small amounts of o-chlorophenol to improve solubility in some instances) for the complex merocyanine dyes of Formula II. The dyes are advantageously incorporated in the finished, washed emulsions and should be uniformly distributed throughout the emulsions. The following procedure is satisfactory: Stock solutions of the sensitizing dyes desired are prepared by dissolving the dyes in appropriate solvents as described above. Then, to one liter of a flowable gelatino-silver-halide emulsion, the desired amounts of the stock solution of one of the dyes is slowly added, while stirring the emulsion. Stirring is continued until the dye is thoroughly incorporated in the emulsion. Then the desired amount of the stock solution of the second dye is slowly added to the emulsion, while stirring. Stirring is continued until the second dye is thoroughly incorporated. The supersensitized emulsion can then be coated out on a suitable support, such as glass, cellulose derivative film, resin film, or paper, to a suitable thickness and allowed to dry. The details of such coating methods are well known to those skilled in the art.

The amounts of the individual sensitizing dyes actually incorporated in the emulsion will vary somewhat from dye to dye, according to the emulsion employed and according to the effect desired. The regulation and adoption of the most economical and useful proportions will be apparent to those skilled in the art upon making the ordinary observations and tests customarily employed in the art. Accordingly, the foregoing procedures and proportions are to be regarded only as illustrative. Clearly my invention is directed to any emulsion containing a combination of the aforesaid sensitizing dyes whereby a supersensitizing effect is obtained.

The following examples will serve to illustrate further the manner of practicing my invention. To different portions of the same batch of photographic gelatino-silver bromiodide emulsion were added (1) a meso-substituted carbocyanine dye selected from those of Formula I above and (2) a combination of the meso-substituted carbocyanine dye and a complex merocyanine dye selected from those represented by Formula II above. In some instances a third coating was prepared using the same emulsion formula and adding only one of the complex merocyanine dyes selected from those of Formula II. In general, the table will show that this third coating gave only a low speed or one too small to measure. Different emulsions were used in some of the examples, although the emulsions of each individual example are obtained from the same batch. Before coating the emulsion containing the sensitizing dyes were digested for a short time in a tank maintained at 52° C., and the sensitized emulsion coated and processed. The different portions of emulsion were then coated on glass supports and exposed in the usual manner in a spectrograph and a sensitometer (type Ib). Exposures were made with white light, through a Wratten 25 filter, i. e. a filter which transmits substantially no light of wavelength shorter than 580 mu (a "red" light exposure), or through a Wratten 12 filter, i. e. a filter which transmits substantially no light of wavelength shorter than 495 mu (about 1 per cent transmission from 300 to 340 mu, i. e. a "minus blue" exposure). Following are several examples of such emulsions together with the speed (white, red, or minus blue), gamma and fog obtained.

| Ex. | Dye (g/mol.) | White Light Ex. | | | Red Light Ex. | | | Minus Blue Ex. | |
|---|---|---|---|---|---|---|---|---|---|
| | | Speed | Gamma | Fog | Speed | Gamma | Fog | Speed | Gamma |
| 1 | (a) 3,3'-dimethyl-9-phenyl-4,5,4',5'-dibenzothiacarbocyanine bromide (0.120) | | | | 19.5 | 2.67 | .10 | | |
| | (b) 5-[(1-ethyl-2(1)-β-naphthothiazolylidene)-α-ethylethylidene]-3-β-methoxyethyl-2-(3-β-methoxyethyl-4-oxo-2-thiono-5-thiazolidylidene)-4-thiazolidone (0.001) | | | | 3.7 | 3.42 | .05 | | |
| | (c) dye (a) (0.120) plus dye (b) (0.001) | | | | 26.5 | 2.91 | .09 | | |
| 2 | (d) 9-ethyl-3,3'-dimethyl-4,5,4',5'-dibenzothiacarbocyanine bromide (0.120) | | | | 80 | 2.47 | .07 | | |
| | (e) dye (d) (0.120) plus dye (b) (0.001) | | | | 84 | 2.41 | .06 | | |
| 3 | (f) 3,3',9-triethyl-4,5,4',5'-dibenzothiacarbocyanine bromide (0.120) | | | | 88 | 2.54 | .08 | | |
| | (g) dye (f) (0.120) plus dye (b) (0.001) | | | | 98 | 2.34 | .07 | | |
| 4 | (h) 3,3'-dimethyl-9-phenylthiacarbocyanine iodide (0.120) | 45 | 1.95 | .06 | 6.1 | 2.12 | | 16.0 | 2.30 |
| | (i) 2-(3-carbethoxymethyl 4-oxo-2-thiono-5-thiazolidylidene)-3-ethyl-5-[(3-ethyl-2(3)-benzothiazolylidene)ethylidene]-4-thiazolidone (0.002) | | | | | | | | |
| | (j) dye (h) (0.120) plus dye (i) (0.002) | 45 | 2.40 | .04 | 2.75 | 1.46 | | 3.55 | 1.90 |
| 5 | (k) 3,3'-diethyl-9-phenyl-4,5,4',5'-dibenzothiacarbocyanine bromide (0.120) | 54 | 1.88 | .07 | 10.8 | 1.85 | | 25.5 | 2.10 |
| | (l) dye (k) (0.120) plus dye (b) (0.001) | | | | 31 | 3.04 | .08 | | |
| 6 | (m) 3,3'-dimethyl-9-phenylselenacarbocyanine bromide (0.120) | 40 | 1.82 | .05 | 31 | 3.15 | .07 | | |
| | (n) dye (m) (0.120) plus dye (i) (0.002) | 49 | 1.84 | .06 | 6.3 | 1.87 | | 11.2 | 1.75 |
| 7 | (o) 5,5'-dichloro-3,3',9-triethylthiacarbocyanine bromide (0.120) | | | | 10.0 | 1.97 | | 15.5 | 2.10 |
| | (p) dye (o) (0.120) plus dye (b) (0.001) | | | | 86 | 2.46 | .07 | | |
| 8 | (q) 5-[(1-ethyl-2(1)-β-naphthothiazolylidene)-α-phenylethylidene]-3-β-methoxyethyl-2-(3-β-methoxyethyl-4-oxo-2-thiono-5-thiazolidylidene)-4-thiazolidone (0.002) | | | | 96 | 2.35 | .06 | | |
| | (r) dye (h) (0.120) plus dye (q) (0.002) | 44 | 2.30 | .04 | 3.3 | 2.32 | | 3.9 | 2.40 |
| 9 | (s) 5,5'-dichloro-3,3'-diethyl-9-phenylselenacarbocyanine iodide (0.120) | 76 | 1.46 | .06 | 13.5 | 1.58 | | 34.0 | 1.75 |
| | | | | | 98 | 2.87 | .08 | | |
| 10 | (t) dye (s) (0.120) plus dye (b) (0.001) | | | | 100 | 3.04 | .06 | | |
| | (u) dye (h) (0.080) | | | | 10.5 | 3.02 | .07 | | |
| 11 | (v) dye (h) (0.080) plus dye (b) (0.001) | | | | 31 | 3.52 | .07 | | |
| | (w) dye (m) (0.120) | 40 | 1.82 | .05 | 6.3 | 1.87 | | 11.2 | 1.75 |
| | (x) dye (m) (0.120) plus dye (q) (0.002) | 61 | 1.96 | .05 | 18.5 | 2.22 | | 28.0 | 2.4 |

The accompanying drawing illustrates the supersensitizing effect obtained with three of my new combinations in silver bromiodide emulsions. Each figure of the drawing is a diagrammatic reproduction of two spectrograms. In each figure the sensitivity of the emulsion containing the meso-substituted carbocyanine dye is represented by the lower curve. The upper curve represents the sensitivity conferred on the emulsion by the combination of the meso-substituted carbocyanine dye and the complex merocyanine dye. No curve showing the sensitivity conferred on the emulsion by the complex merocyanine dye alone is shown, since the sensitivity conferred by the complex merocyanine in question is too weak to be significant in the comparisons shown below.

In Fig. 1, curve A represents the sensitivity of an ordinary gelatino-silver-bromiodide emulsion sensitized with 3,3'-dimethyl-9-phenylselenacarbocyanine bromide, and curve B represents the sensitivity of the same emulsion containing 3,3'-dimethyl - 9 - phenylselenacarbocyanine bromide and 5-[(1-ethyl-2(1)-β-naphthothiazolylidene)-α - phenylethylidene]-3-β-methoxyethyl-2-(3-β-methoxyethyl - 4 - oxo - 2 - thiono-5-thiazolidylidene)-4-thiazolidone.

In Fig. 2, curve C represents the sensitivity of an ordinary gelatino-silver-bromiodide emulsion sensitized with 3,3'-dimethyl-9-phenylthiacarbocyanine iodide, and curve D represents the sensitivity of the same emulsion containing 3,3'-dimethyl-9-phenylthiacarbocyanine iodide and 5-[(1 - ethyl - 2(1) - β-naphthothiazolylidene)-α-phenylethylidene] - 3 - β-methoxyethyl-2-(3-β-methoxyethyl - 4 - oxo-2-thiono-5-thiazolidylidene)-4-thiazolidone.

In Fig. 3, curve E represents the sensitivity of an ordinary gelatino-silver-bromiodide emulsion sensitized with 3,3'-dimethyl-9-phenylthiacarbocyanine iodide, and curve F represents the sensitivity of the same emulsion containing 3,3'-dimethyl-9-phenylthiacarbocyanine iodide and 2-(3-carbethoxymethyl-4-oxo-2-thiono-5-thiazolidylidene) - 3-ethyl-5-[(3-ethyl-2(3)-benzothiazolylidene)ethylidene]-4-thiazolidone.

My invention is primarily directed to the ordinarily employed gelatino-silver-halide developing-out emulsions, e. g. gelatino-silver-chloride, -chlorobromide, -chloriodide, -chlorobromiodide, -bromide and -bromiodide developing-out emulsions. While the results in the above table were obtained using gelatino-silver-bromiodide emulsions, excellent results have also been obtained using gelatino-silver-chlorobromide emulsions. Emulsions which form the latent image mostly inside the silver halide grains, such as the emulsion set forth in U. S. Patent 2,456,956, dated December 21, 1948, can also be employed in practicing my invention.

The emulsions prepared in accordance with my invention can be coated in the usual manner on any suitable support, e. g. glass, cellulose nitrate film, cellulose acetate film, polyvinyl acetal resin film, paper or metal.

The complex merocyanine dyes of Formula II can also be advantageously prepared according to the methods described in my copending application Serial No. 274,445, filed March 1, 1952.

What I claim as my invention and desire secured by Letters Patent of the United States is:

1. A photographic silver halide emulsion sensitized with a supersensitizing combination of at least one meso-substituted dye selected from those represented by the following general formula:

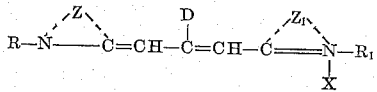

wherein R and $R_1$ each represents an alkyl group, D represents a member selected from the group consisting of an alkyl group and an aryl group, Z and $Z_1$ each represents the non-metallic atoms necessary to complete a heterocyclic nucleus selected from the group consisting of those of the benzothiazole series, those of the benzoselenazole series, and those of the β-naphthothiazole series, and X represents an acid anion, and at least one complex merocyanine dye selected from those represented by the following general formula:

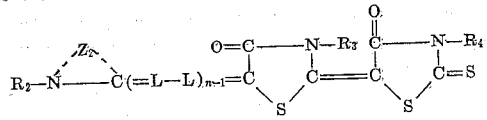

wherein $R_2$, $R_3$, and $R_4$ each represents an alkyl group, L represents a methine group, $n$ represents a positive integer of from 1 to 2, and $Z_2$ represents the non-metallic atoms necessary to complete a heterocyclic nucleus selected from the group consisting of those of the benzothiazole series and those of the β-naphthothiazole series.

2. A photographic gelatino-silver-halide, developing-out emulsion sensitized with a supersensitizing combination of at least one meso-substituted dye selected from those represented by the following general formula:

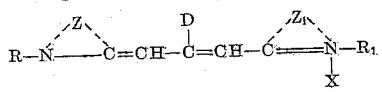

wherein R and $R_1$ each represents an alkyl group, D represents a member selected from the group consisting of an alkyl group and an aryl group, Z and $Z_1$ each represents the non-metallic atoms necessary to complete a heterocyclic nucleus selected from the group consisting of those of the benzothiazole series, those of the benzoselenazole series, and those of the β-naphthothiazole series, and X represents an acid anion, and at least one complex merocyanine dye selected from those represented by the following general formula:

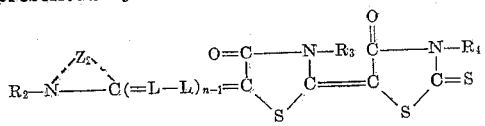

wherein $R_2$, $R_3$, and $R_4$ each represents an alkyl group, L represents a methine group, $n$ represents a positive integer of from 1 to 2, and $Z_2$ represents the non-metallic atoms necessary to complete a heterocyclic nucleus selected from the group consisting of those of the benzothiazole series and those of the β-naphthothiazole series.

3. A photographic gelatino-silver-bromiodide, developing-out emulsion sensitized with a supersensitizing combination of at least one meso-substituted dye selected from those represented by the following general formula:

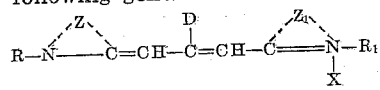

wherein R and $R_1$ each represents an alkyl group, D represents a member selected from the group consisting of an alkyl group and an aryl group, Z and $Z_1$ each represents the non-metallic atoms necessary to complete a heterocyclic nucleus selected from the group consisting of those of the benzothiazole series, those of the benzoselenazole series, and those of the β-naphthothiazole series, and X represents an acid anion, and at least one complex merocyanine dye selected from those represented by the following general formula:

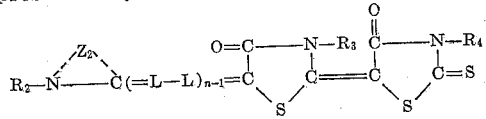

wherein $R_2$, $R_3$ and $R_4$ each represents an alkyl group, L represents a methine group, $n$ represents a positive integer of from 1 to 2, and $Z_2$ represents the non-metallic atoms necessary to complete a heterocyclic nucleus selected from the group consisting of those of the benzothiazole series and those of the β-naphthothiazole series.

4. A photographic silver-halide, developing-out emulsion sensitized with a supersensitizing combination of at least one meso-substituted dye selected from those represented by the following general formula:

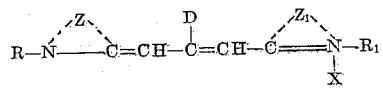

wherein R and $R_1$ each represents an alkyl group of from 1 to 2 carbon atoms, D represents a member selected from the group consisting of an alkyl group of from 1 to 2 carbon atoms and a mononuclear aromatic group of the benzene series, Z and $Z_1$ each represents the non-metallic atoms necessary to complete a heterocyclic nucleus selected from the group consisting of those of the benzothiazole series, those of the benzoselenazole series, and those of the β-naphthothiazole series, and X represents an acid anion, and at least one complex merocyanine dye selected from those represented by the following general formula:

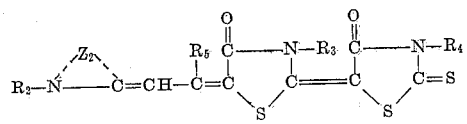

wherein $R_2$ represents an alkyl group of from 1 to 2 carbon atoms, $R_3$ and $R_4$ each represents a member selected from the group consisting of a methyl group, an ethyl group, a β-methoxyethyl group, and a carbethoxymethyl group, $R_5$ represents a member selected from the group consisting of a hydrogen atom, an alkyl group of from 1 to 2 carbon atoms, and a mononuclear aromatic group of the benzene series, and $Z_2$ represents the non-metallic atoms necessary to complete a heterocyclic nucleus selected from the group consisting of those of the benzothiazole series and those of the β-naphthothiazole series.

5. A photographic silver bromiodide, developing-out emulsion sensitized with a supersensitizing combination of at least one meso-substituted dye selected from those represented by the following general formula:

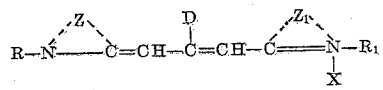

wherein R and $R_1$ each represents an alkyl group of from 1 to 2 carbon atoms, D represents a member selected from the group consisting of an alkyl group of from 1 to 2 carbon atoms and a mononuclear aromatic group of the benzene series, Z and $Z_1$ each represents the non-metallic atoms necessary to complete a heterocyclic nucleus selected from the group consisting of those of the benzothiazole series, those of the benzoselenazole series, and those of the β-naphthothiazole series, and X represents an acid anion, and at least one complex merocyanine dye selected from those represented by the following general formula:

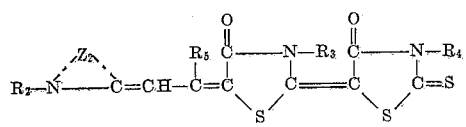

wherein $R_2$ represents an alkyl group of from 1 to 2 carbon atoms, $R_3$ and $R_4$ each represents a member selected from the group consisting of a methyl group, an ethyl group, a $\beta$-methoxyethyl group, and a carbethoxymethyl group, $R_5$ represents a member selected from the group consisting of a hydrogen atom, an alkyl group of from 1 to 2 carbon atoms, and a mononuclear aromatic group of the benzene series, and $Z_2$ represents the non-metallic atoms necessary to complete a heterocyclic nucleus selected from the group consisting of those of the benzothiazole series and those of the $\beta$-naphthothiazole series.

6. A photographic silver-halide, developing-out emulsion sensitized with a supersensitizing combination of at least one meso-substituted dye selected from those represented by the following general formula:

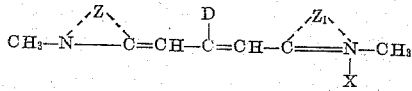

wherein D represents a mononuclear aromatic group of the benzene series, Z and $Z_1$ each represents the non-metallic atoms necessary to complete a heterocyclic nucleus of the benzothiazole series, and X represents an acid anion, and at least one complex merocyanine dye selected from those represented by the following general formula:

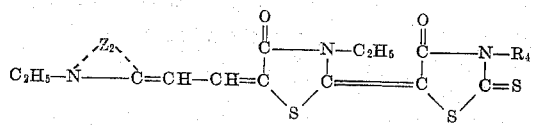

wherein $R_4$ represents a carbethoxymethyl group and $Z_2$ represents the non-metallic atoms necessary to complete a heterocyclic nucleus of the benzothiazole series.

7. A photographic silver-halide, developing-out emulsion sensitized with a supersensitizing combination of at least one meso-substituted dye selected from those represented by the following general formula:

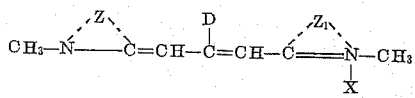

wherein D represents a mononuclear aromatic group of the benzene series, Z and $Z_1$ each represents the non-metallic atoms necessary to complete a heterocyclic nucleus of the $\beta$-naphthothiazole series, and X represents an acid anion, and at least one complex merocyanine dye selected from those represented by the following general formula:

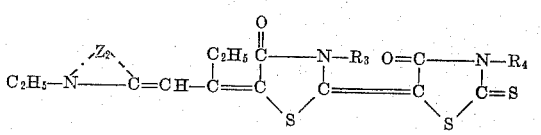

wherein $R_3$ and $R_4$ each represents a $\beta$-methoxyethyl group and $Z_2$ represents the non-metallic atoms necessary to complete a heterocyclic nucleus of the $\beta$-naphthothiazole series.

8. A photographic silver-halide, developing-out emulsion sensitized with a supersensitizing combination of at least one meso-substituted dye selected from those represented by the following general formula:

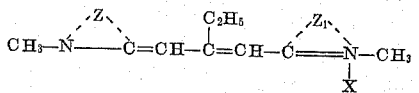

wherein Z and $Z_1$ each represents the non-metallic atoms necessary to complete a heterocyclic nucleus of the $\beta$-naphthothiazole series, and X represents an acid anion, and at least one complex merocyanine dye selected from those represented by the following general formula:

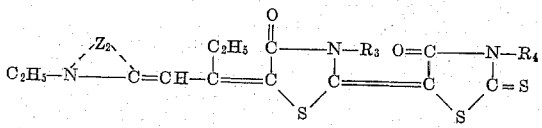

wherein $R_3$ and $R_4$ each represents a $\beta$-methoxyethyl group and $Z_2$ represents the non-metallic atoms necessary to complete a heterocyclic nucleus of the $\beta$-naphthothiazole series.

9. A photographic silver-halide, developing-out emulsion sensitized with a supersensitizing combination of at least one meso-substituted dye selected from those represented by the following general formula:

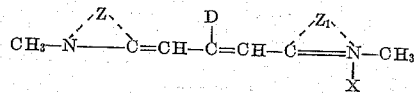

wherein D represents a mononuclear aromatic group of the benzene series, Z and $Z_1$ each represents the non-metallic atoms necessary to complete a heterocyclic nucleus of the benzoselenazole series, and X represents an acid anion, and at least one complex merocyanine dye selected from those represented by the following general formula:

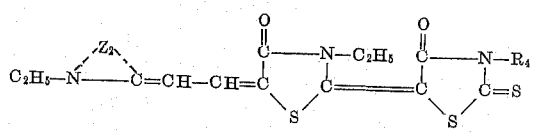

wherein $R_4$ represents a carbethoxymethyl group and $Z_2$ represents the non-metallic atoms necessary to complete a heterocyclic nucleus of the benzothiazole series.

10. A photographic silver halide, developing-out emulsion sensitized with a supersensitizing combination of at least one meso-substituted dye selected from those represented by the following general formula:

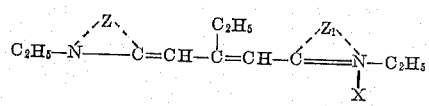

wherein Z and $Z_1$ each represents the non-metallic atoms necessary to complete a heterocyclic nucleus of the $\beta$-naphthothiazole series and X represents an acid anion, and at least one complex merocyanine dye selected from those represented by the following general formula:

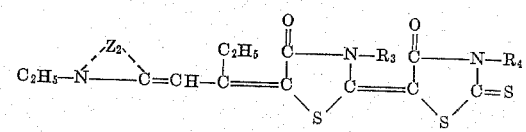

wherein $R_3$ and $R_4$ each represents a $\beta$-methoxyethyl group and $Z_2$ represents the non-metallic atoms necessary to complete a heterocyclic nucleus of the $\beta$-naphthothiazole series.

11. A photographic gelatino - silver - halide, developing-out emulsion sensitized with a super-sensitizing combination of a 3,3'-dialkyl-9-phenylthiacarbocyanine salt and a 2-(3-alkyl-4-oxo-2-thiono - 5 - thiazolidylidene) - 3 - alkyl-5-[(3-alkyl-2(3)- benzothiazolylidene)ethylidene]-4-thiazolidone.

12. A photographic gelatino-silver-halide, developing-out emulsion sensitized with a supersensitizing combination of 3,3'-dimethyl-9-phenylthiacarbocyanine iodide and 2-(3-carbethoxymethyl-4-oxo-2-thiono - 5 - thiazolidylidene)-3-ethyl - 5 -[(3 - ethyl - 2(3) - benzothiazolylidene)ethylidene]-4-thiazolidone.

13. A photographic gelatino-silver-halide, developing-out emulsion sensitized with a supersensitizing combination of a 3,3'- dialkyl - 9- phenyl-4,5,4',5'-dibenzothiacarbocyanine salt and a 5-[(1-alkyl-2(1)-β-naphthothiazolylidene)-α-ethylethylidene] - 3 - alkyl - 2 -(3-alkyl-4-oxo-2-thiono-5-thiazolidylidene)-4-thiazolidone.

14. A photographic gelatino-silver-halide, developing-out emulsion sensitized with a supersensitizing combination of 3,3'- dimethyl - 9-phenyl-4,5,4',5'-dibenzothiacarbocyanine bromide and 5-[(1-ethyl-2(1)-β-naphthothiazolylidene)-α- ethylethylidene]- 3 -β- methoxyethyl - 2 -(3-β-methoxyethyl - 4 - oxo - 2 - thiono-5-thiazolidylidene)-4-thiazolidone.

15. A photographic gelatino-silver-halide, developing-out emulsion sensitized with a supersensitizing combination of a 3,3'-dialkyl-9-ethyl-4,5,4',5'- dibenzothiacarbocyanine salt and a 5 -[(1 - alkyl - 2(1) -β- naphthothiazolylidene)-α-ethylethylidene]- 3 - alkyl - 2(3 - alkyl-4-oxo-2-thiono-5-thiazolidylidene)-4-thiazolidone.

16. A photographic gelatino-silver-halide, developing-out emulsion sensitized with a supersensitizing combination of 9-ethyl-3,3'-dimethyl-4,5,4',5'- dibenzothiacarbocyanine bromide and 5-[(1 - ethyl - 2(1) -β- naphthothiazolylidene)-α-ethylethylidene] - 3 - β - methoxyethyl-2-(3-β-methoxyethyl-4-oxo - 2 - thiono - 5 - thiazolidylidene)-4-thiazolidone.

17. A photographic gelatino-silver-halide, developing-out emulsion sensitized with a supersensitizing combination of a 3,3'-dialkyl-9-phenylselenacarbocyanine salt and a 2-(3-alkyl-4-oxo-2-thiono - 5 - thiazolidylidene) - 3 - alkyl-5-[(3-alkyl - 2(3) - benzothiazolylidene)ethylidene]-4-thiazolidone.

18. A photographic gelatino-silver-halide, developing-out emulsion sensitized with a supersensitizing combination of 3,3'- dimethyl - 9-phenylselenacarbocyanine bromide and 2-(3-carbethoxymethyl-4-oxo-2-thiono-5-thiazolidylidene)-3-ethyl-5-[(3-ethyl-2(3)- benzothiazolylidene)ethylidene]-4-thiazolidone.

19. A photographic gelatino-silver-halide, developing-out emulsion sensitized with a supersensitizing combination of 3,3',9-triethyl-4,5,4',5'-dibenzothiacarbocyanine bromide and 5-[(1-ethyl - 2(1)-β- naphthothiazolylidene)-α- ethylethylidene]-3-β-methoxyethyl-2-(3 -β- methoxyethyl-4-oxo-2-thiono-5-thiazolidylidene) - 4-thiazolidone.

BURT H. CARROLL.

No references cited.